United States Patent
Schneider

(10) Patent No.: US 6,802,461 B2
(45) Date of Patent: Oct. 12, 2004

(54) AEROSOL SPRAY CAN WITH PRESSURE REDUCING VALVE

(75) Inventor: Heinz Schneider, Langenselbold (DE)

(73) Assignee: Thomas GmbH, Langenselbold (DE)

( * ) Notice: Subject to any disclaimer, the term of this patent is extended or adjusted under 35 U.S.C. 154(b) by 0 days.

(21) Appl. No.: 10/311,011

(22) PCT Filed: Jun. 7, 2001

(86) PCT No.: PCT/EP01/06423
§ 371 (c)(1), (2), (4) Date: Apr. 16, 2003

(87) PCT Pub. No.: WO01/96208
PCT Pub. Date: Dec. 20, 2001

(65) Prior Publication Data
US 2003/0150884 A1 Aug. 14, 2003

(30) Foreign Application Priority Data
Jun. 14, 2000 (DE) .......................... 100 29 228

(51) Int. Cl.⁷ ................................................ B05B 11/24
(52) U.S. Cl. ..................... 239/337; 222/396; 222/402.1
(58) Field of Search ................... 239/337; 137/505.25; 222/396, 397, 402.1, 402.24, 402.25

(56) References Cited

U.S. PATENT DOCUMENTS

| | | | |
|---|---|---|---|
| 3,005,577 A | | 10/1961 | Webster |
| 3,081,919 A | | 3/1963 | Samuel |
| 3,666,148 A | | 5/1972 | Webster |
| 3,799,448 A | * | 3/1974 | Nozawa et al. ............. 239/321 |
| 4,017,031 A | * | 4/1977 | Kishi et al. ................. 239/333 |
| 4,094,314 A | * | 6/1978 | Le Cornec ............. 128/204.26 |
| 4,313,642 A | * | 2/1982 | Berisch ..................... 303/9.71 |
| 4,384,745 A | * | 5/1983 | Belart et al. ............... 303/9.73 |
| 5,480,069 A | * | 1/1996 | Barney et al. .............. 222/401 |
| 5,669,675 A | * | 9/1997 | Mueller et al. .......... 303/119.2 |
| 5,732,735 A | * | 3/1998 | Birch .................... 137/505.11 |
| 5,857,479 A | * | 1/1999 | Cords et al. ............. 137/116.3 |
| 5,927,824 A | * | 7/1999 | Pahl et al. ................ 303/113.2 |
| 6,505,646 B1 | * | 1/2003 | Singleton ................. 137/625.3 |

FOREIGN PATENT DOCUMENTS

EP 0774703 A1 * 5/1997

* cited by examiner

Primary Examiner—William Doerrler
Assistant Examiner—Mohammad M. Ali
(74) Attorney, Agent, or Firm—Stites & Harbison PLLC; Douglas E. Jackson

(57) ABSTRACT

For a pressure reduction, an aerosol spray can filled with a compressed pressure gas requires, upstream of its spray valve (14), a pressure regulation valve (10) with a closing point (28). In known embodiment types a flow occurs around the outside of the pressure reduction valve, which requires a complicated housing structure. It is therefore proposed that the connection between the closing point (28) and the spray valve (14) take place via a central bore (58) in the piston (22) of the pressure reduction valve (10), preferably without a flow through the pressure chamber (26), but instead past the latter. The simple construction is advantageous, with which it is also possible to provide easy access to the piston (22) from the outside in order to maintain it in its opened position for easier filling under pressure.

14 Claims, 4 Drawing Sheets

AEROSOL SPRAY CAN WITH PRESSURE REDUCING VALVE

Figure 1:
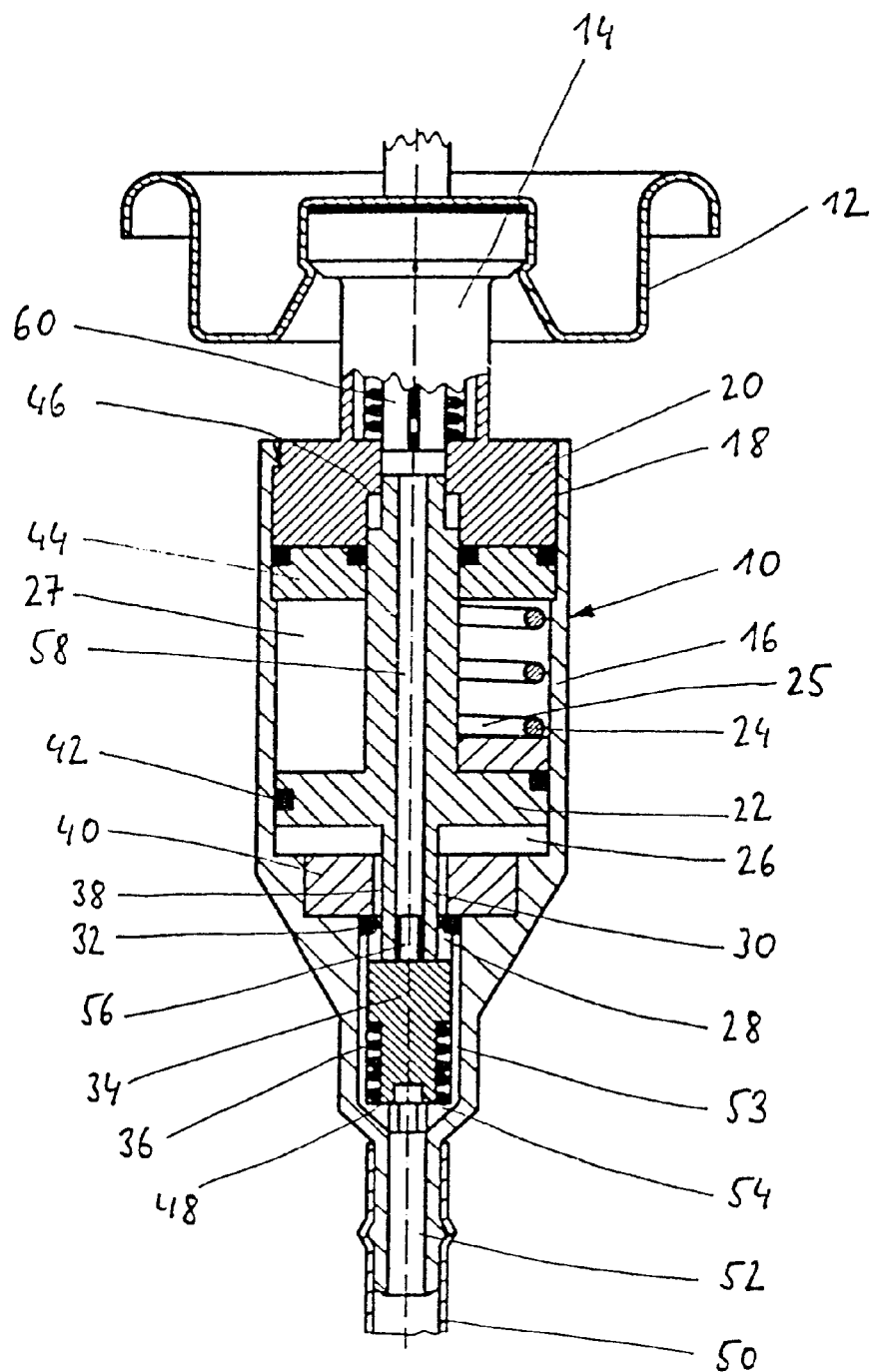

The invention relates to an aerosol can with a pressure reduction valve between the interior of the can and a spray valve, wherein, viewed in the outflow direction downstream of a closing site, a pressure chamber is provided for pressure regulation, in which a piston can be moved which closes the closing point against the force of a spring, for example a helical spring or a gas pressure spring, when pressure in the pressure chamber rises above the standard pressure.

For regulating the pressure in connection with aerosol cans filled with compressed gases, it is required to install a pressure regulating valve upstream of the spray valves which, with a filling pressure of approximately 10 bar inside the can, provides a standard pressure of approximately 2 to 4 bar. Pressure reduction valves with spring-loaded pistons are already known for this purpose, which provide the closing of a pressure-regulated closing site when the regulated pressure rises. However, with the known solutions the exiting aerosol flows around the cylinder/piston unit, so that an elaborate dual-walled housing structure is required. Such a solution has been described, for example, in WO 01/09009 A1.

The object of the present invention is to create a spray can with a pressure reduction valve which is easier to produce in comparison with already known embodiments.

In accordance with the invention, this object is attained by means of a spray can of the type described at the outset, wherein the connection between the closing site for pressure regulation and the spray valve is provided by means of a center bore in the piston.

The aerosol spray can in accordance with the invention offers the advantage that it is not necessary to provide an additional housing wall for conducting the aerosol around the cylinder/piston unit, so that the production outlay is reduced. The slightly increased thickness, for example of a piston rod used for regulating the closing site, poses no problems here.

In a preferred embodiment of the aerosol spray can in accordance with the invention there is no flow-through of the pressure chamber, so that an effect by dynamic occurrences on the accuracy of regulation in the area of the piston must only be feared to a lesser degree.

In a particularly preferred embodiment of the invention it is provided that the piston of the pressure reduction valve is accessible from the outside in such a way that it can be mechanically moved into its position in which it clears the closing site.

Such an embodiment, which can only be achieved with a large outlay in connection with a pressure reduction valve around which an outer flow occurs, permits a problem-free filling process, in which the piston is prevented from moving into its closed position, or at least into a position in which its opening cross section is reduced and the filling process therefore made more difficult under the very high pressure charge from the outside then occurring. An end stop preferably limits the opening stroke in order to prevent in this case damage to undefined contact points between the piston and the housing.

Alternatively to a mechanical displacement of the piston in its position in which it releases the closing site, the provision of some sort of overpressure valve is also conceivable which, in case of a pressure charge from the outside which considerably exceeds the interior can pressure, clears an opening to the can interior. However, this means an increased structural outlay.

In a preferred embodiment of the invention, it is provided that the closing site is formed between a sealing element fixed on the housing and a piston rod, or a separate element, which can be axially moved through the piston.

In the simplest case the piston and the piston rod can be embodied in one piece, wherein the sealing element preferably rests against the exterior circumference of the piston rod and closes a radial opening to its central bore in the closing site. With such a solution it is also conceivable that the sealing element clears the closing site in case of a pressure charge from outside which considerably exceeds the interior can pressure.

It is also alternatively conceivable to provide a separate closing element for forming the closing site with the sealing element, which can be moved into a position where it is lifted off the sealing element by means of a piston rod in case of a pressure drop.

The connection between the pressure chamber and the areas through which the flow passes can be provided either by means of an annular groove around the piston rod, which is connected with the closing site, or also by means of a radial bore in the piston rod, which provides the required active connection without the exiting aerosol flowing through the pressure chamber.

Embodiments of piston rods without radial bores are open at their front ends and are embodied to be laterally slit in this area in order to assure the flow-through of the aerosol.

A particular advantage of the aerosol spray can of the invention lies in that it is possible to provide a housing for the pressure reduction valve which supports the sealing element of the closing site and whose exterior wall delimits the pressure chamber on the inside. The spring of the pressure reduction valve, which is embodied as a helical spring or a gas pressure spring, is arranged between the housing and the piston, wherein the spring is preferably supported on a housing insert, which is locked, pressed, welded and/or glued together with the cylinder wall of the housing. The space between the housing and the piston in which the spring is arranged is preferably pressure-sealed toward the can interior in order to avoid an effect on the pressure regulation by penetrating aerosol. The space-saving construction of the pressure valve of a spray can in accordance with the invention permits the provision of the largest possible piston diameter, along with a corresponding adaptation of the force of the piston spring, and in this way the optimization of the regulation accuracy. A pressure gas cushion, which constitutes a gas pressure spring, can also be enclosed in the sealed space between the housing and the piston.

Figure 2:
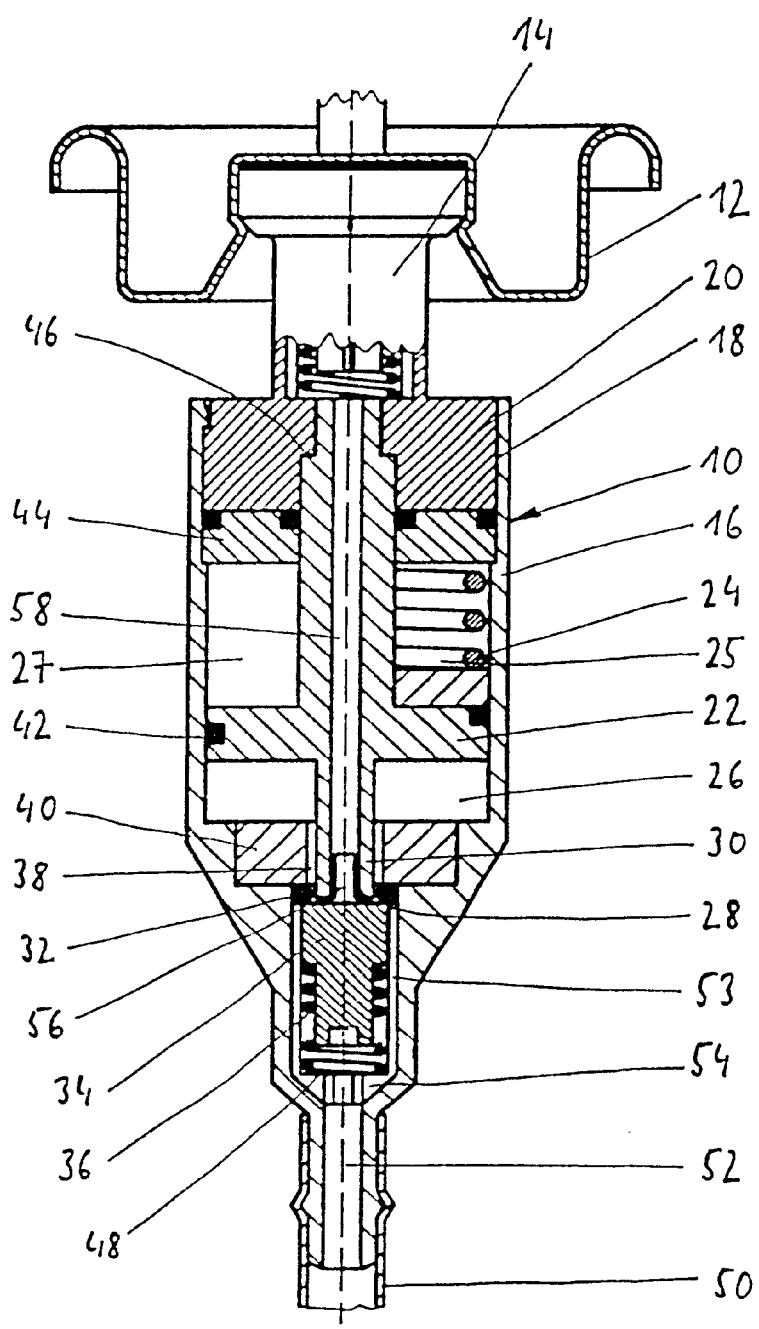
Figure 3:
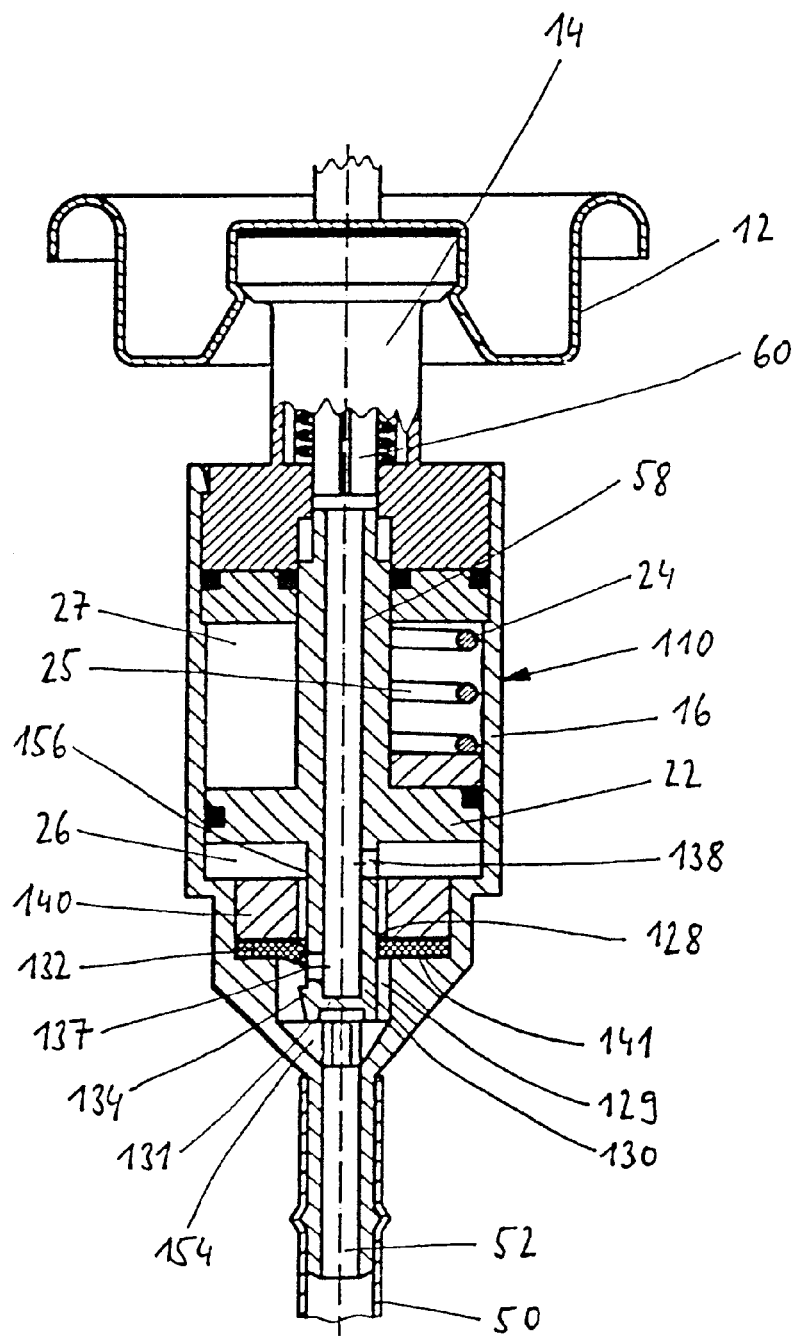
Figure 4:
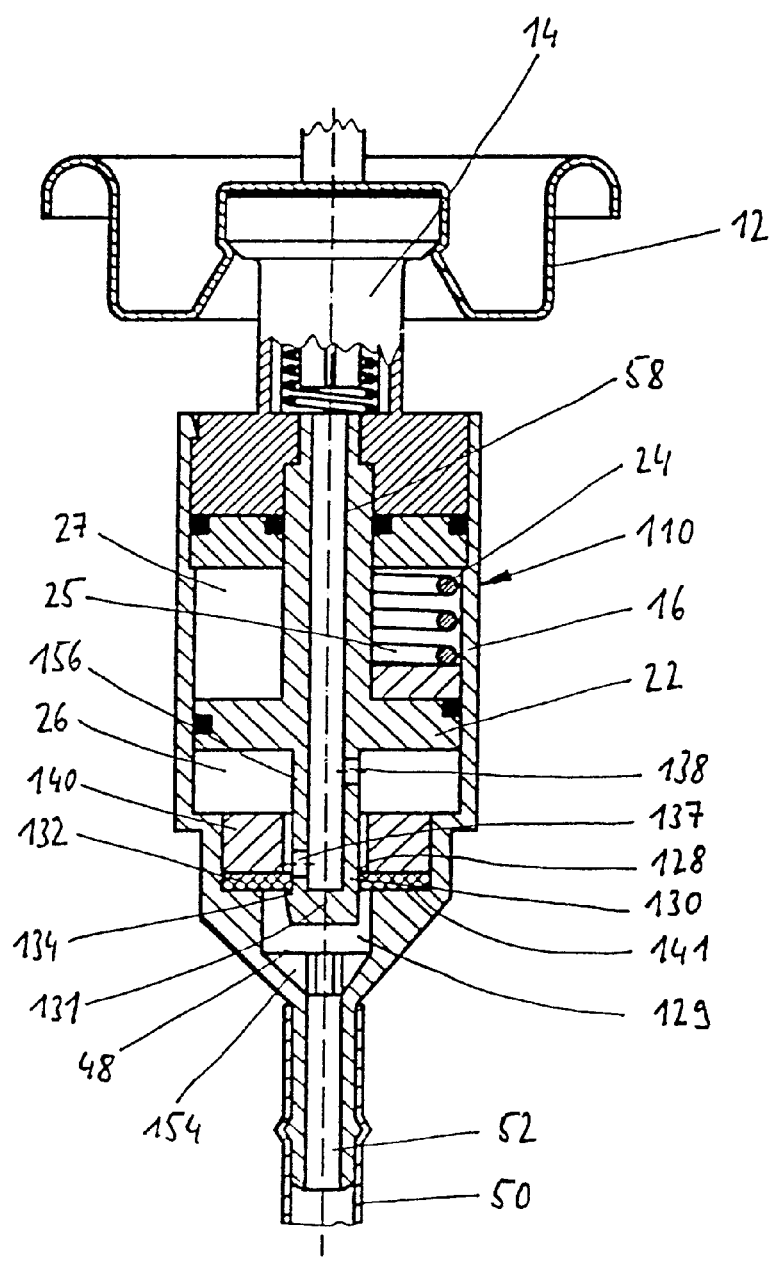

Exemplary embodiments will be discussed in greater detail by means of the attached drawings in what follows. Shown are in:

FIG. 1, a cross section of a pressure reduction valve of a spray can in the pressureless, empty state of the can, FIG. 2, the pressure reduction valve in FIG. 1 in the closed position of rest after the can has been filled, FIG. 3, a cross section of a further embodiment of a pressure reduction valve in the pressureless, empty state of the can, FIG. 4, the pressure reduction valve in FIG. 3 in its position of rest after the can has been filled.

A pressure reduction valve 10 is represented in FIG. 1, which is sealingly connected with a valve cover 12, preferably made of a thin sheet of metal or of aluminum, which in turn closes an aerosol spray can (not represented) in a pressure-sealed manner. A spray valve, not shown in greater detail, by means of which the directed spraying of the contents of the can is made possible by pushing down a spray head, is provided in the head area of the pressure reduction valve 10.

The pressure reduction valve 10 substantially consists of a housing 16 which, in its rear, cylindrically embodied area 18 is closed by means of a housing insert 20, which provides the connection with the valve cover 12 and receives the spray valve 14, a movable piston 22, which is in equlibrium between a compression spring 24 and a regulating pressure in a pressure chamber 26 acting on its piston face, and a closing site 28 for pressure regulation, which can be actuated by means of the piston 22 via a piston rod 30. The housing 16 constitutes the outer wall of the pressure chamber 26 and supports a sealing element 32, embodied as an O-ring, and which, together with a closing element 34 which is movable in the housing 16 coaxially in respect to the piston 22, constitutes the closing site 28. With the piston 22 displaced by pressure against the force of its spring 24, a securing spring 36 maintains the closing element 34 sealingly on the sealing element 32.

The connection between the pressure chamber 26 and the closing site 28 takes place via an annular conduit 38, which surrounds the piston rod 30 and which is bordered from the outside by a holding insert 40, which constitutes an axial support for the sealing element 32.

In FIGS. 1 to 4, the pressure spring is represented alternatively in the form of a helical spring 24 (right halves of the drawing figures) and in the form of an enclosed pressure gas cushion 27 (left drawing figure halves).

Sealing of the space 25 for receiving the helical spring 24 between the housing 16 and the piston 22 is provided by means of an O-ring 42 between the piston 22 and the inner wall of the housing 16, and two additional O-rings between a holding element 44, inserted into the housing and also used for supporting the helical spring 24, and the inner wall of the housing 16, or the outer wall of the piston rod 30 in this area. A stop 46 limits the stroke of the piston 22 in the area of the housing insert 20, while a second stop 48 provided on the side of the housing limits the stroke of the piston 22 in the opened position.

The outflow of the aerosol initially takes place through a tube or hose 50 extending into the vicinity of the bottom of the aerosol spray can, a housing connector 52 terminating in the chamber of the housing 16 which contains the closing element 34, then on through slits 54 in the front face of the stop 48, which provide a flow cross section even when they rest against the second stop, through longitudinal grooves 53 in the housing 16, along the outside of the closing element 34 through second slits 56 in the front area of the piston rod 30 into a central bore 58 in the piston rod and up to the spray valve 14, known per se, with its spray head (not shown in detail). The regulating pressure which must be set between the closing site 28 and the spray valve 14 also acts via the annular groove 38 in the pressure chamber 26, without aerosol flowing through the latter. An exchange of the aerosol in the pressure chamber 26 takes place through inflow and outflow in the course of the stroke movements of the piston 22. A continuous flow through the pressure chamber is also conceivable if the inlet opening of the central bore 58 is arranged in the area of the pressure chamber 26.

In the initial position of the pressure regulating valve represented in FIG. 1, the can has not yet been filled, i.e. the can interior is not under pressure, and the compression spring 24 can displace the piston 22 and the closing element 34 against the second stop 48, so that the connection between the spray valve 14 and the can interior is open. The securing spring 36 is compressed by the force of the stronger spring 24 of the piston 22.

For filling the can it is possible to maintain the piston 22 mechanically in this opened position by means of a depressor 60, which here is constituted by the so-called stem, in order to be able to charge the can with a high filling pressure for accelerating the filling process, without a reduction in the cross section at the closing site 28 occurring because of the pressure increasing in the pressure reduction valve 10. At the end of the filling process, the depressor 60 is released, so that the piston can be displaced into its position represented in FIG. 2 under the high interior pressure in the aerosol spray can. In this position the piston rod 30 is lifted off the front face of the closing element 34, and the latter is pressed against the sealing element 32 by the force of the securing spring 36 and with the aid of the interior can pressure as soon as the desired regulating pressure of approximately 3 bar has been reached in the pressure chamber 26.

If, following an opening of the spray valve 14, the pressure in the area between the spray valve 14 and the closing point 28 drops, the force exerted by the pressure on the piston 22 falls, so that the compression spring 24 again starts to displace the piston while taking along the closing element 34 until, following the lift-off of the closing element 34 from the sealing element 32 and the possible inflow of aerosol, the regulating pressure has again been reached in the pressure chamber 26 and leads to the closing of the closing site 28. An equilibrium is reached in the area of the closing site 28 during continuous spraying of the contents of the can and provides the desired pressure drop, without a continuously repeated closing movement of the piston 22 occurring.

For improving the regulating accuracy it is desirable to provide the largest possible piston diameter, wherein the force of the compression spring 24 must of course be matched to the desired regulating pressure.

A further embodiment of a pressure reduction valve 110 is represented in cross section in FIG. 3, which in its essential parts corresponds to the embodiment represented in FIGS. 1 and 2. Therefore identical parts have been provided with identical reference numerals.

Differences exist in the area of a differently embodied closing site 128 and a piston rod 130, modified in its lower area 156 which, together with a washer 132 clamped between a holder insert 140 and a housing shoulder 141, constitutes the closing site 128. The piston rod 130, which is again provided with a bore 58, is closed on its front end 131, wherein slits 154 are again provided in the area of the housing stop 48, which allow the inflow of aerosol out of the housing connector 52 into an annular chamber 129 provided in the area of the closing point.

The piston rod has a first radial bore 137 which, in the opened position of the piston 22, provides a connection between the annular chamber 129 and the bore 58 in the piston 22. A second radial bore provides a connection between the bore 58 in the piston 22 and the pressure chamber 26 in order to be able to perform the desired pressure regulation as already explained in connection with FIGS. 1 and 2.

In the position represented in FIG. 3, which the pressure reduction valve 110 assumes with the spray can unfilled and not under pressure, the piston rod 130 of the piston is seated on the second housing stop 48 by means of the force of a compression spring 24. In this case the first radial bore 137 is located axially offset in respect to the washer 132, so that its cross section is open.

After filling the spray can under pressure, which again takes place, if required, with the help of the depressor 60 which holds the piston 22 fast in a position which increases the opening cross section of the closing site 128, the piston takes up the position represented in FIG. 4, in which the pressure prevailing in the pressure chamber 26 displaces the piston against the force of the pressure spring 24, so that the radial bore 137 is moved into an area downstream of the washer 132, which sealingly rests against the outer circumference of the piston rod 130 and in this way seals the high interior can pressure of approximately 10 bar, which prevails in the housing connector 52, against the areas downstream of the washer 132 as far as the spray valve 14 at a regulating pressure of approximately 3 bar. A moving hook 134, which can also be embodied to be in the shape of a ring over the entire circumference, here provides the optimum positioning of the washer in order to assure a good sealing effect over a long time.

Further embodiments of details are of course conceivable, for example, in the embodiment represented in FIGS. 1 and 2, the radial bore 138 can replace the annular conduit 38, or it can be provided in a complementary manner and, as already mentioned, it is also possible to employ gas pressure springs with appropriate characteristic lines besides the helical springs. In general, it is possible to improve the accuracy of regulation by increasing the ratio of the diameters between the sealing point constituted by the O-ring 42 and that of the sealing element 32, or the washer 132 in the area of the closing sites 28, 128. Since the diameter of the sealing element 32, or of the washer 132 cannot be arbitrarily reduced, an increased piston diameter can be sensible, however, the can volume should not be reduced too greatly. For most applications it has been shown to be sufficient for attempting a regulating pressure between 2 and three bar, wherein fluctuations within this range are quite safe and can be easily achieved with geometric conditions which meet the practical needs.

The pressure reduction valve 10 does not necessarily have to be a structural unit together with the spray valve. Instead, it is conceivable to produce the pressure reduction valve separately and then to connect it upstream of the spray valve by means of a hose or tube. Although in that case the embodiment of a depressor is possible only in a limited way, there is the possibility of falling back on existing production facilities for valve heads with spray valves.

What is claimed is:

1. An aerosol spray can comprising:
   a pressure reduction valve provided between a can interior and a closeable spray valve,
   wherein, viewed in an outflow direction downstream of a closing site, a pressure chamber is provided for pressure regulation,
   in which pressure chamber a piston can be moved which closes the closing site against a force of a spring, when pressure in the pressure chamber rises above a standard pressure, and
   wherein a connection between the closing site and the spray valve takes place via a central bore in the piston.

2. The aerosol spray can in accordance with claim 1, characterized in that the pressure chamber is arranged outside of a flow-through.

3. The aerosol spray can in accordance with claim 1, characterized in that:
   with the pressure reduction valve mounted in the aerosol can, the piston is accessible from outside such that the piston can be mechanically moved into a position in which the piston releases the closing site, and
   a final stop for limiting an opening stroke is provided.

4. The aerosol spray can in accordance with claim 1, characterized in that:
   the closing site is formed between a sealing element fixed on a housing and a separate closing element which can be axially moved through the piston, and
   wherein the sealing element preferably rests against the separate closing element which separate closing element is provided for constituting the closing site, and which separate closing element can be moved by means of a piston rod into a position in which the separate closing element is lifted off the sealing element when a pressure drop occurs.

5. The aerosol spray can in accordance with claim 4, characterized in that in a front area the piston rod is open and has lateral slits.

6. The aerosol spray can in accordance with claim 4:
   characterized in that the outer wall of the housing supporting the sealing element delimits the pressure chamber on the inside, and
   wherein the spring is arranged between the housing and the piston, and
   wherein a space between the housing and the piston in which the spring is arranged is pressure-sealed against the can interior.

7. The aerosol spray can in accordance with claim 6, characterized in that an insert is locked, pressed, welded and/or glued together with the cylinder wall of the housing for supporting the spring on the housing.

8. The aerosol spray can in accordance with claim 1, wherein the spring is a helical spring.

9. The aerosol spray can in accordance with claim 1, wherein the spring is a pressure spring.

10. The aerosol spray can in accordance with claim 1, characterized in that:
    the closing site is formed between a sealing element fixed on a housing and a piston rod which can be axially moved through the piston,
    wherein the sealing element preferably rests against the outer circumference of the piston rod and in the sealing position seals a radial opening in the central bore towards the can interior.

11. The aerosol spray can in accordance with claim 10, characterized in that:
    the pressure chamber extends around some areas of the piston rod and
    a radial bore is provided for connecting the pressure chamber with the bore in the piston rod.

12. The aerosol spray can in accordance with claim 10, characterized in that a predetermined opening point is provided which, in case of a pressure charge from the outside of a pressure which considerably exceeds the interior can pressure, releases an opening toward the can interior, wherein the sealing element preferably releases the closing site in case of a pressure charge from the outside which considerably exceeds the interior can pressure.

13. The aerosol spray can in accordance with claim 12:
    characterized in that the outer wall of the housing supporting the sealing element delimits the pressure chamber on the inside,
    wherein the spring is arranged between the housing and the piston, and
    wherein a space between the housing and the piston in which the spring is arranged is pressure-sealed against the can interior.

14. A pressure reduction valve for employment with an aerosol spray can comprising:
    wherein, viewed in an outflow direction downstream of a closing site, a pressure chamber is provided for pressure regulation,
    in which pressure chamber a piston can be moved which, when pressure in the pressure chamber rises above a standard pressure, closes a closing site against a force of a spring,
    characterized in that the * can be connected upstream by means of a hose, tube, or the like, and that the connection between the closing site and the spray valve takes place via a central bore in the piston.

* * * * *